United States Patent [19]
Shlien

[11] Patent Number: 5,400,596
[45] Date of Patent: Mar. 28, 1995

[54] AUTOMOTIVE SYSTEM

[76] Inventor: David J. Shlien, 6716 Leland Way, Hollywood, Calif. 90028

[21] Appl. No.: 800,435

[22] Filed: Nov. 29, 1991

Related U.S. Application Data

[63] Continuation-in-part of Ser. No. 471,619, Jan. 29, 1990, abandoned.

[51] Int. Cl.⁶ .................................................. F02G 3/02
[52] U.S. Cl. .................................... 60/597; 60/716
[58] Field of Search ............... 60/597, 620, 605.1, 60/716; 123/543

[56] References Cited

U.S. PATENT DOCUMENTS

| | | | |
|---|---|---|---|
| 2,214,400 | 9/1940 | Betrey | 123/543 |
| 2,280,487 | 4/1942 | Heylaudt | 60/605.1 |
| 4,407,132 | 10/1983 | Kawakatsu et al. | 60/716 |
| 4,665,704 | 5/1987 | Hartwig | 60/597 |
| 4,704,571 | 11/1987 | Rosenberg | 60/597 |
| 4,805,409 | 2/1989 | Kobayashi | 60/597 |
| 4,899,542 | 2/1990 | Iino | 60/487 |

FOREIGN PATENT DOCUMENTS 0119922 7/1983 Japan .................................. 60/605.1

Primary Examiner—Richard A. Bertsch
Assistant Examiner—Charles G. Freay
Attorney, Agent, or Firm—Sanford Astor

[57] ABSTRACT

This invention relates to the use of the exhaust of an internal combustion engine to contribute to forward motion by a pneumatic device connected directly to the drive train and a motor generator connected to the drive train to contribute to acceleration and to provide regenerative braking. All of the automobiles electrical needs are supplied by recaptured momentum when driving conditions allow. Surplus electricity is stored to further contribute to acceleration.

7 Claims, 1 Drawing Sheet

AUTOMOTIVE SYSTEM

This application is a continuation-in-part of U.S. patent application Ser. No. 07/471,619, filed Jan. 29, 1990, abandoned Apr. 22, 1992.

BACKGROUND OF THE INVENTION

The following described invention has been described in my Disclosure Document No. 224,594, filed Apr. 13, 1989.

The present invention relates to a system for recovering exhaust gas energy from an internal combustion engine and a method for utilizing the exhaust gas energy to contribute to the forward motion and operation of electrical accessories.

It is well known that the internal combustion engine discards a great deal of its energy as waste. Various methods have been proposed for recovering the exhaust gas energy in order to attempt to use that energy to recover the lost power. Some methods of recovering the lost energy have been described in U.S. Pat. No. 4,805,409.

In the method shown in U.S. Pat. No. 4,805,409, the exhaust from the exhaust system of the internal combustion engine powers a turbine which runs an A.C. generator and an A.C. motor for utilization of the exhaust energy. This method is highly inefficient.

SUMMARY OF THE INVENTION

Accordingly, it is an object of the present invention to provide a method for efficiently recovering the exhaust gas energy of an internal combustion engine which can then be utilized to contribute to forward motion.

It is a further object of the invention to utilize the exhaust gas energy to operate a motor generator connected to the drive train to contribute to acceleration and to provide regenerative braking.

Yet a further object of the invention is to provide a system for operating the automobile's electrical needs by recaptured momentum when driving conditions allow so that there is no drag on the crankshaft for the operation of the electrical needs. Surplus electricity could be stored to further contribute to acceleration.

In the instant invention, the exhaust energy can contribute the power directly to the drive train or by connection to a generator that would then drive a motor generator that is connected to the drive train. Direct mechanical connection is more efficient.

All accessories such as the cooling fan, water pump, etc., would be operated electrically so as not to load the drive train during acceleration.

The electric motors and generators utilized would be of the permanent magnet type. Alternating current type motors and generators are far less efficient and if the system utilizes a generator to power a motor, the efficiency in the use of alternating current systems decreases exponentially.

Direct current motors and generators could best be controlled by selecting different armature windings made possible by placing a tapped armature on the stater with a permanent magnet as the rotor. This design is the subject of my U.S. Pat. No. 4,949,023 issued Aug. 14, 1990.

The drive motor-generator could be connected between the engine and the transmission via clutches. During deceleration, the engine clutch could disengage so that the vehicle would "free wheel" except for drag from the still engaged generator and thereby maximum momentum recovery (conversion to electricity in storage) could be achieved. The motor-generator might also substitute for synchronizer clutches in the transmission by adjusting input shaft speed to synchronize gears in accordance with the tachometer inside the transmission. The use of a continuously variable transmission (CVT) would eliminate the need for synchronization altogether and provide the ideal situation for energy recovery and return (through the same device) to the drive train.

Engine cooling system heat could be used for mixture preheat, especially valuable for alcohol operation. Excess heat from a catalytic converter could also be used, though heat should be conserved for exhaust drive power when possible. Ceramic combustion chamber parts could help in this respect.

Engine manifold intake flow might be used to turn pinwheels or other devices to provide more complete mixture atomization and vaporization.

BRIEF DESCRIPTION OF THE DRAWINGS

The foregoing and other objects, features, and advantages of the present invention, will be made clearer from the following detail description of preferred emodiments referred to in the accompanying drawings in which.

Figure 1:
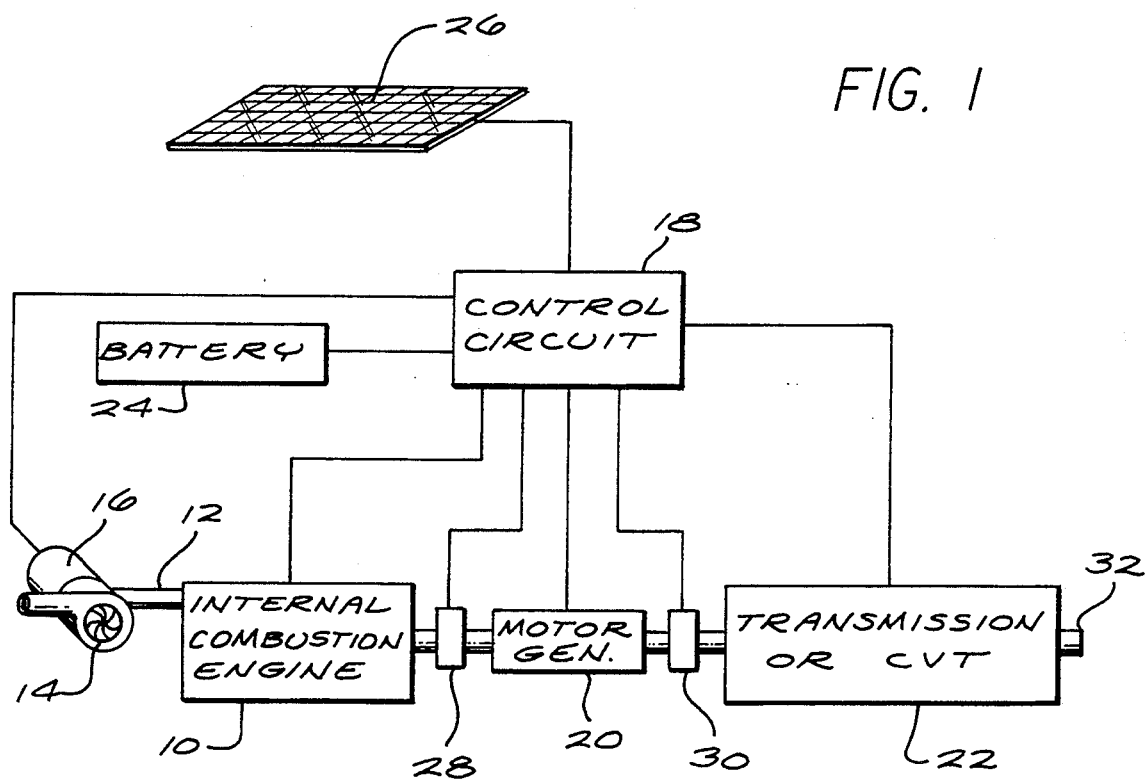
FIG. 1 is a block diagram of an example of the apparatus used to carry out this invention.

Referring now to the drawings, there is shown in FIG. 1, the internal combustion engine, 10, in which exhaust passing through exhaust line 12 operates a pneumatic device, 14, such as a turbine, piston, or other pneumatic device.

The turbine operates a direct current generator, 16, for the generation of electrical energy. The power generated by the generator, 16, is controlled by a control circuit, 18, and is then used to operate a motor generator, 20. Motor generator 20 is connected to the transmission 22 so that the power of the motor generator is added to that of the internal combustion engine for acceleration and operation of the transmission and motion of the automobile.

During the braking mode, the motor, 20, acts as an electrical generator and the control device, 18, is operated in a regenerative mode so as to store the power in a battery, 24.

The automobile may also contain a solar panel, 26, in which the energy recovered by the solar panel can be passed through the control circuit and added to the energy provided to the motor generator 20.

The drive motor generator, 20, is connected between the engine and transmission by clutch 28 and clutch 30. Clutch 28 operates as the engine clutch which connects the motor generator to the transmission 22, providing the output 32 to the drive wheels of the automobile, not shown. During deceleration, the engine clutch, 28, could disengage so that the vehicle would "free wheel" except for drag from the still engaged generator through clutch 30 and thereby maximum momentum recovery could be achieved. The motor generator 20 might also substitute for synchronizer clutches in the transmission by adjusting the input shaft speed to synchronize gears in accordance with the tachometer inside the transmission. The use of a continuously variable transmission (CVT), well known in the field, would eliminate the need for synchronization altogether and provide the ideal situation for energy recovery and return to the drive train.

The motor generator 20 in the drive train may double as a starter. In addition, all accessories, such as the water pump, fan, and oil pump, may be electrically powered through the control circuit releasing them from the drive train and thus preventing their drag on the drive train of the automobile.

The engine cooling system heat could be used for mixture preheat which is especially valuable for operation of internal combustion engines with alcohol. The excess heat from a catalytic converter could also be used for mixture preheat, though heat should be conserved for exhaust drive power when possible. Ceramic combustion chamber parts could help in this respect.

Engine manifold intake flow might be used to turn pinwheels or other devices to provide more complete mixture atomization and vaporization.

Figure 2:
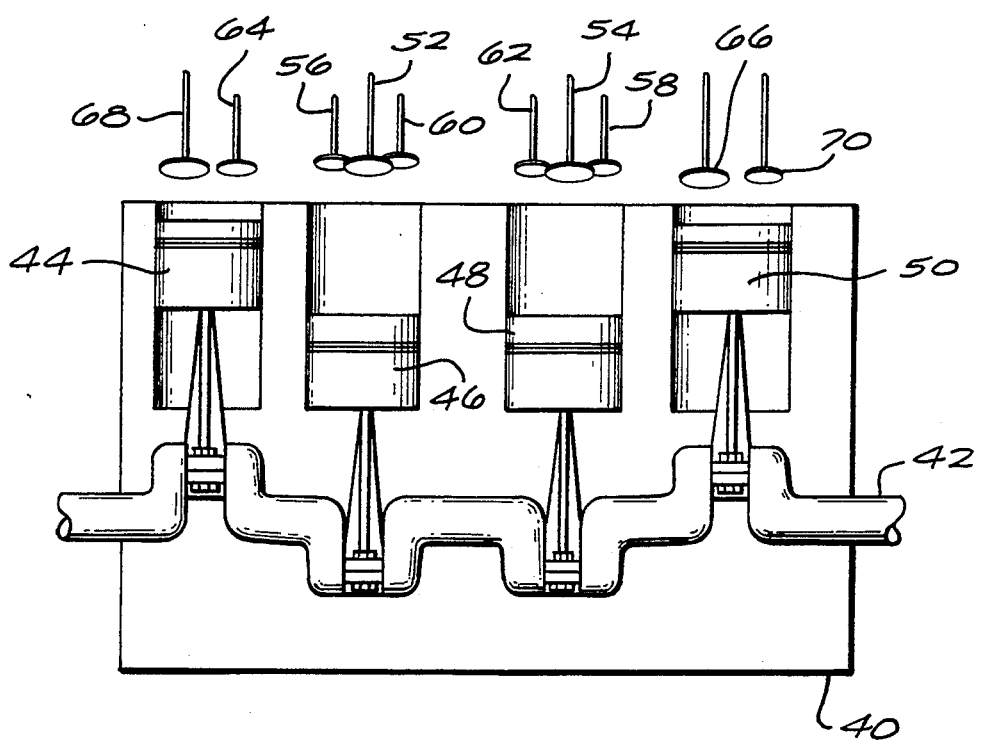
FIG. 2 is a diagrammatic description of a method of connecting the exhaust gas energy directly to the drive train.

Referring now to FIG. 2, there is shown a method to connect the exhaust energy system directly to the internal combustion engine. There is shown the block, 40, of the internal combustion engine, with the crankshaft, 42. Four pistons, 44, 46, 48 and 50, are connected to the crankshaft 42.

Pistons 46 and 48 contain three (3) valves rather than two (2) as is normally contained in the standard internal combustion engine. A detailed description of the three-valve engine is contained in my co-pending patent application. In this emodiment, one of the three valves, 52, 54, acts as the standard intake for the combustion mixture. The second of the three valves, 56, 58, is the standard exhaust valve. The third valve, 60, 62, operates as follows:

Near the bottom of the power stroke of a standard four-stroke internal combustion engine, the extra, or third exhaust valve, 60, and 62, opens and the exhaust gasses are forced out through the valve and through a line into the intake valves 64 and 66 of pistons 44 and 50.

Just past the bottom of the power stroke, the extra exhaust valves 60 and 62 close and the normal exhaust valves 56 and 58 open so that the exhaust gasses exit through the normal exhaust lines. Thus, the gasses are passed through the extra or third valves, 60 and 62, only for a short period near the bottom of the stroke, when the least resistance to the upward movement of the piston will take place, because there is very little movement in this zone.

The exhaust gasses coming through exhaust valves 60 and 62, thus enter exhaust intake valves 64 and 66 and power pistons 44 and 50 as stated. On the upward stroke of pistons 44 and 50, the exhaust valves 68 and 70 of pistons 44 and 50 open and the exhaust is then exited from the piston chambers. Thus, pistons 44 and 50 are operated solely by the exhaust coming from pistons 46 and 48, but only by the exhaust that is taken near the bottom of the power stroke thereby giving greater power without power loss associated with back pressure in the exhaust.

Utilizing the features of this invention, all of the automobile's electrical needs could be supplied by recaptured momentum when driving conditions allow. Any surplus electricity would be stored in the battery to further contribute to acceleration. All accessories, such as the cooling fan, water pump, etc., would be operated electrically so as not to load the drive train during acceleration.

As stated, the electric motors and generators would be of the permanent magnet type. Alternating current motors and generators are far less efficient.

Those systems that utilize the exhaust directly from the exhaust system of the internal combustion engine cause back pressure due to the exhaust motor and the back pressure causes such a loss in benefits and energy saving that the system does not provide sufficient additional energy to be practical.

Having thus described the invention, it is requested that the patent be limited only by the scope of the appended claims.

I claim:

1. A propulsion system for a vehicle having an internal combustion engine, drive wheels and a transmission comprising a direct current motor generator connected between the engine and transmission to add power to the internal combustion engine, a first clutch between said transmission and said motor generator, adapted to disengage the transmission while the engine is running so that the engine can turn the motor generator with the vehicle at rest, a second clutch between said engine and said motor generator, adapted to disengage the engine for regenerative braking or purely electrical operation, and means to achieve continuous variable speed control of said vehicle comprising utilizing a direct current motor generator controlled by selecting different armature windings selected by placing a tapped armature on the stator with a permanent magnet as the rotor.

2. The device of claims 1 further comprising an exhaust gas driven generator adapted to provide power to said direct current motor.

3. A propulsion system for a vehicle having an internal combustion engine, drive wheels and a transmission comprising a direct current motor generator connected between the engine and transmission to add power to the internal combustion engine, a first clutch between said transmission and said motor generator, adapted to disengage the transmission while the engine is running so that the engine can turn the motor generator with the vehicle at rest, a second clutch between said engine and said motor generator, adapted to disengage the engine for regenerative braking or purely electrical operation, and means to achieve continuous variable speed control of said vehicle comprising a continuously variable transmission coupled directly between the direct current motor generator and the drive wheels, wherein the internal combustion engine has pistons, a plurality of the pistons having three associated valves, a first valve for intake, a second valve for exhaust and a third valve adapted to open only near the bottom of the power stroke of the associated piston, to supply exhaust gasses to an exhaust gas driven generator that is adapted to provide power to said direct current motor generator.

4. The device of claim 3 wherein the exhaust gasses exiting through said third valve are passed directly through the intake valve of another piston connected directly to the drive train and driven solely by said exhaust gasses.

5. The device of claim 1 in which said vehicle includes a water pump, fan and oil pump, means to electrically operate the water pump, fan, and oil pump of the vehicle using the power output of said generator.

6. The device of claims 3 or 1 wherein the motor generator also acts as the starter motor for said internal combustion engine.

7. The device of claims 3 or 1 wherein the internal combustion engine cooling system heat is utilized to preheat the air-fuel mixture.

* * * * *